United States Patent
Ishihara (10) Patent No.: US 8,477,034 B2
(45) Date of Patent: Jul. 2, 2013

(54) INFORMATION PROVIDING SYSTEM AND INFORMATION PROVIDING METHOD

(75) Inventor: Takeshi Ishihara, Tokyo (JP)

(73) Assignee: NEC Corporation, Tokyo (JP)

( * ) Notice: Subject to any disclaimer, the term of this patent is extended or adjusted under 35 U.S.C. 154(b) by 1096 days.

(21) Appl. No.: 12/447,520

(22) PCT Filed: Oct. 17, 2007

(86) PCT No.: PCT/JP2007/070240
§ 371 (c)(1),
(2), (4) Date: Apr. 28, 2009

(87) PCT Pub. No.: WO2008/053707
PCT Pub. Date: May 8, 2008

(65) Prior Publication Data
US 2010/0066499 A1    Mar. 18, 2010

(30) Foreign Application Priority Data
Nov. 2, 2006 (JP) ................................. 2006-299095

(51) Int. Cl.
*G06K 7/08* (2006.01)
(52) U.S. Cl.
USPC .. 340/572.1; 340/10.1; 340/994; 340/539.15; 235/384

(58) Field of Classification Search
USPC ........ 340/8.1, 10.1–10.6, 438, 539.1–539.15, 340/572.1–572.9, 994; 235/384; 455/304.1
See application file for complete search history.

(56) References Cited

U.S. PATENT DOCUMENTS

| | | | | |
|---|---|---|---|---|
| 7,802,724 | B1 * | 9/2010 | Nohr | 235/384 |
| 8,090,529 | B2 * | 1/2012 | Jo et al. | 701/465 |
| 2005/0065971 | A1 | 3/2005 | Honda | |
| 2005/0258937 | A1 | 11/2005 | Neuwirth | |
| 2006/0277078 | A1 * | 12/2006 | Ohmori et al. | 705/5 |
| 2007/0265891 | A1 * | 11/2007 | Guo | 705/5 |

FOREIGN PATENT DOCUMENTS

| | | |
|---|---|---|
| JP | 1999016011 A | 1/1999 |
| JP | 2002197495 A | 7/2002 |
| JP | 2002255035 A | 9/2002 |
| JP | 2004117094 A | 4/2004 |
| JP | 2005011007 A | 1/2005 |

(Continued)

OTHER PUBLICATIONS

European Communication for EP07 829 974.0 dated Jul. 15, 2011.

(Continued)

*Primary Examiner* — George Bugg
*Assistant Examiner* — Sharmin Akhter (57) ABSTRACT

An information providing system includes a portable terminal, and a server that provides the portable terminal with information of an arrival time of the portable terminal at a destination. The portable terminal comprises an RFID tag to which identification information of the destination and identification information of a departure place are written; and a communication unit that transmits the destination identification information, the departure place identification information, and information of a departure time which is a current time to the server when triggered by the departure place identification information written in the RFID tag. The server comprises an arrival time deriving unit that derives the arrival time at the destination using the departure place identification information, the destination identification information, and the departure time information transmitted from the portable terminal; and a communication unit that transmits the information of the arrival time at the destination to the portable terminal.

16 Claims, 7 Drawing Sheets

FOREIGN PATENT DOCUMENTS

| | | | |
|---|---|---|---|
| JP | 2006004164 A | 1/2006 |
| JP | 2006023793 A | 1/2006 |
| JP | 2006202103 A | 8/2006 |
| JP | 2006227834 A | 8/2006 |
| JP | 2006236066 A | 9/2006 |
| JP | 2006246386 A | 9/2006 |
| JP | 2006259835 A | 9/2006 |
| WO | 2005114604 A | 12/2005 |
| WO | 2005124644 A | 12/2005 |
| WO | 2006012997 A | 2/2006 |

OTHER PUBLICATIONS

Supplementary European Search Report for EP 07 82 9974 dated Jan. 20, 2011.
European Communication for EP07 829 974.0 issued Jan. 11, 2012.
International Search Report for PCT/JP2007/070240 mailed Nov. 20, 2007.

* cited by examiner

INFORMATION PROVIDING SYSTEM AND INFORMATION PROVIDING METHOD

TECHNICAL FIELD

The present invention relates to an information providing system and an information providing method.

BACKGROUND ART

Recently, a technology for providing various pieces of information using RFID technology has been disclosed (see Patent Document 1). A technology for providing various pieces of information using information on people who use transportation facilities such as an electric train has also been disclosed (see Patent Document 2). In addition, a technology for providing the function of a commutation ticket by embedding an RFID tag in a portable terminal has been commercialized.

If the above-described technology is used, information of a departure station, which is a departure place, can be written from an automatic ticket gate to an RFID tag of the portable terminal when a user passes through the automatic ticket gate. An arrival station, which is a destination, is pre-registered in a commutation ticket of the portable terminal.

Accordingly, a service for deriving an arrival time of the user of the portable terminal at the destination and providing the arrival time to the user or to a concerned person such as a family or acquaintance of the user can be realized by using the information obtained from the portable terminal.

However, in the above-described service, the destination is limited to an arrival station of the commutation ticket since the route of the commutation ticket is fixed. Since the user himself/herself knows the time when he/she passed through the automatic ticket gate of the departure station, it is considered that the arrival time at the destination is less useful for the user. As long as the concerned person can also identify the time when the user passed through the automatic ticket gate, it is considered that the arrival time at the destination, which is the arrival station of the commutation ticket, is less useful.

Because of this background, demands are increasing for a service in which not only the arrival station of the commutation ticket of the user can be known, but also the arrival time at an arbitrary destination can be known.

Patent Document 1: Japanese Laid-Open Patent Application No. 2002-197495

Patent Document 2: Japanese Laid-Open Patent Application No. 2005-011007

DISCLOSURE OF THE INVENTION

Therefore, an object of the present invention is to provide an information providing system and an information providing method in which a user, etc. can know an arrival time to an arbitrary destination.

An information providing system of the present invention has a portable terminal and a server that provides the portable terminal with information of an arrival time of the portable terminal at a destination.

In a first information providing system of the present invention, the portable terminal includes an RFID tag to which identification information of the destination and identification information of a departure place are written; and a communication unit that transmits the destination identification information, the departure place identification information, and information of a departure time which is a current time to the server when triggered by the departure place identification information written in the RFID tag. The server includes an arrival time deriving unit that derives the arrival time at the destination using the departure place identification information, the destination identification information, and the departure time information transmitted from the portable terminal; and a communication unit that transmits the information of the arrival time at the destination to the portable terminal.

In a second information providing system of the present invention, the portable terminal includes an input unit to which identification information of the destination is input; a storage unit in which the destination identification information is stored; an RFID tag to which identification information of a departure place is written; and a communication unit that transmits the destination identification information, the departure place identification information, and information of a departure time which is a current time to the server when triggered by the departure place identification information written in the RFID tag. The server includes an arrival time deriving unit that derives the arrival time at the destination using the departure place identification information, the destination identification information, and the departure time information transmitted from the portable terminal; and a communication unit that transmits the information of the arrival time at the destination to the portable terminal.

An information providing method of the present invention allows a server to provide a portable terminal with information of an arrival time of the portable terminal at a destination.

A first information providing method of the present invention has the steps of:

writing, by the portable terminal, identification information of the destination and identification information of a departure place to an RFID tag;

transmitting, by the portable terminal, the destination identification information, the departure place identification information, and information of a departure time which is a current time to the server when triggered by the departure place identification information written in the RFID tag;

deriving, by the server, the arrival time at the destination using the departure place identification information, the destination identification information, and the departure time information transmitted from the portable terminal; and transmitting, by the server, the information of the arrival time at the destination to the portable terminal.

A second information providing method of the present invention has the steps of:

inputting, by the portable terminal, identification information of the destination;

storing, by the portable terminal, the destination identification information;

writing, by the portable terminal, identification information of a departure place to an RFID tag;

transmitting, by the portable terminal, the destination identification information, the departure place identification information, and information of a departure time which is a current time to the server when triggered by the departure place identification information written in the RFID tag;

deriving, by the server, the arrival time at the destination using the departure place identification information, the destination identification information, and the departure time information transmitted from the portable terminal; and transmitting, by the server, the information of the arrival time at the destination to the portable terminal.

BEST MODE FOR CARRYING OUT THE INVENTION

Hereinafter, the best mode for carrying out the invention will be described with reference to the accompanying drawings. On the other hand, in the following description, a person who actually uses an electric train and who uses a commutation ticket is referred to as a "user", and a family, acquaintance, or etc. of the user is referred to as a "concerned person."

First Embodiment

Figure 1:
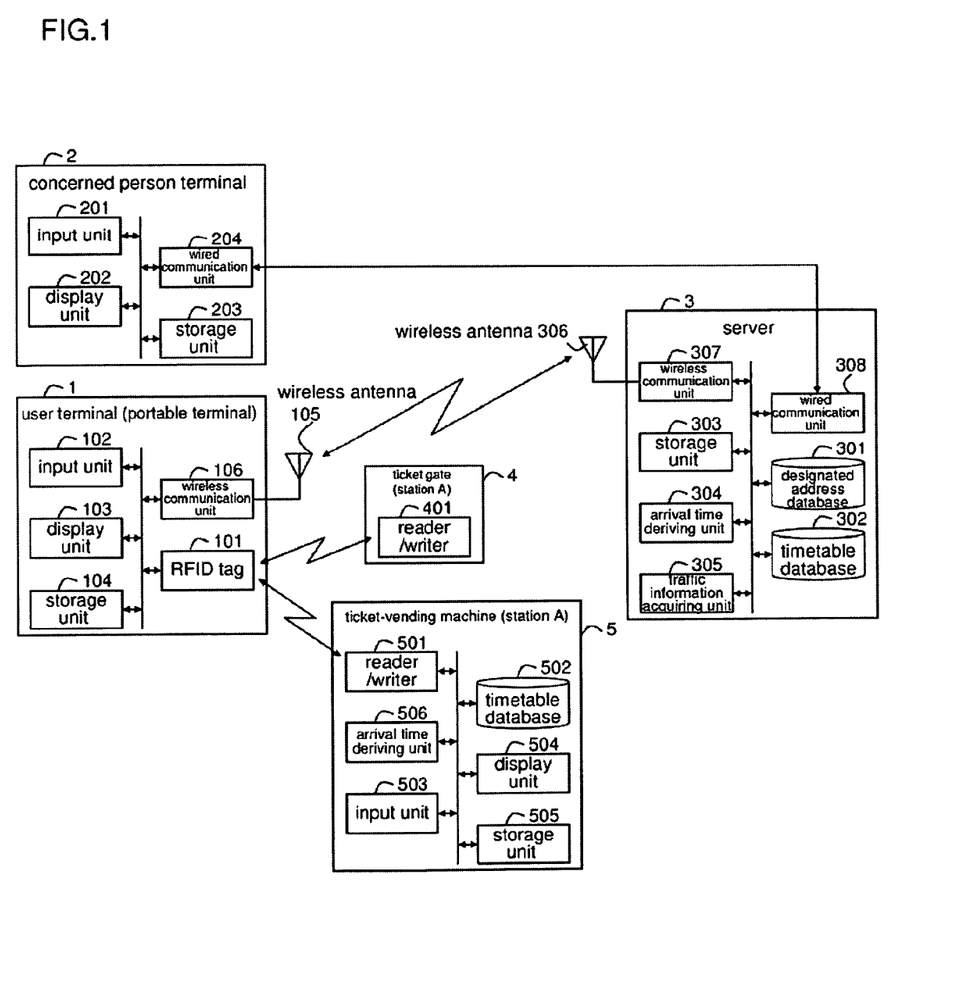
FIG. 1 is a view illustrating the configuration of an information providing system of a first embodiment of the present invention.

FIG. 1 illustrates the configuration of an information providing system of a first embodiment of the present invention.

Referring to FIG. 1, the information providing system of this embodiment has user terminal 1 which is a portable terminal to be used by the user, concerned person terminal 2 to be used by the concerned person, server 3 for providing user terminal 1 and concerned person terminal 2 with various information, automatic ticket gate 4 which is a departure place passage checking device installed in an arbitrary departure place (here, referred to as station A), and ticket-vending machine 5 which is a destination input device installed in the arbitrary departure place (here, referred to as station A).

On the other hand, in FIG. 1, only automatic ticket gate 4 and ticket-vending machine 5 installed in station A are illustrated since it is assumed that the departure place of the user is station A, but they may be installed in other stations. In FIG. 1, one user terminal 1, one concerned person terminal 2, one automatic ticket gate 4, and one ticket-vending machine 5 are illustrated, but the number thereof is not limited to one. In FIG. 1, only basic constituent elements for realizing the present invention are illustrated, and other constituent elements are omitted.

In this embodiment, user terminal 1 has RFID tag 101 embedded therein and a function of a commutation ticket (here, referred to as commutation ticket between station A and station B) of an electric train. Specifically, information of station A and station B which are departure stations and an arrival station of the commutation ticket, information of a charge amount which is a collected amount, etc. are pre-written in RFID tag 101. For example, when user terminal 1 passes through automatic ticket gate 4 of station A which is the departure place, a station name code which is identification information of station A is written in RFID tag 101 by reader/writer 401 of automatic ticket gate 4. User terminal 1 can input a station name code of a station which is an arbitrary destination according to predetermined method.

User terminal 1 transmits station name codes of the departure place and the destination and information of a departure time to server 3 when triggered by the station name code of the departure place written in RFID tag 101. Server 3 derives an arrival time at the destination using information received from user terminal 1 and transmits the derived arrival time information to user terminal 1 and concerned person terminal 2.

In this embodiment, the following (A) and (B) methods can be used as methods for inputting the destination information to user terminal 1.

(A) Station names are allocated to all stations and a list of station name codes is disclosed in each station. Ticket-vending machine 5 has a function for receiving a station name code of a station which is a destination and a function of reader/writer 501 for writing the station name code of the destination to RFID tag 101. When the user inputs the station name code of the destination to ticket-vending machine 5 and moves user terminal 1 to reader/writer 501, the station name code of the destination is written in RFID tag 101 by reader/writer 501.

(B) The user himself/herself directly inputs the station name code of the station which is the destination. In this case, the station name code of the destination is stored in storage unit 104. On the other hand, input of the station name code can be performed on the screen of an application embedded in user terminal 1, and can be performed on a screen transmitted from server 3. The station name code can be inputted before or after the user passes through automatic ticket gate 4. The station name code input is not limited to station A which is the departure place and it is also possible to input the station name code which is located in a remote place.

In this embodiment, when the user does not input the destination, the destination becomes a default (here, station B which is the arrival station of the commutation ticket). In this case, when a concerned person knows the destination of the user, the arrival time of the user at the destination can be known when a concerned person takes the initiative to transmit to server 3 the station name code of the destination of the user.

Hereinafter, a configuration of this embodiment for realizing the above-described operation will be described in detail.

User terminal 1 has RFID tag 101, input unit 102, display unit 103, storage unit 104, wireless antenna 105, and wireless communication unit 106.

When the user passes through the neighborhood of automatic ticket gate 4 of station A which is the departure place, the station name code of station A is written in RFID tag 101 by reader/writer 401 of automatic ticket gate 4. When the user inputs the station name code of the destination station to input unit 503 of ticket-vending machine 5 of station A and moves user terminal 1 to reader/writer 501 of ticket-vending machine 5, the destination station name code is written in RFID tag 101 by reader/writer 501.

Input unit 102 is a key, etc. for allowing the user to input various information, display unit 103 is a display, etc. for displaying various information, and storage unit 104 is a memory, etc. for storing various information. For example, when the user directly inputs the destination station name code to input unit 102, the destination station name code is stored in storage unit 104.

Wireless communication unit 106 performs wireless communication with server 3 through wireless antenna 105. For example, wireless communication unit 106 transmits the station name code of the departure place, the destination station name code written in RFID tag 101 or stored in storage unit 104 and information of a departure time which is a current time to server 3 when triggered by the station name code written in RFID tag 101 by automatic ticket gate 4. Wireless communication unit 106 receives information, such as the arrival time of the user at the destination, from server 3.

Concerned person terminal 2 has input unit 201, display unit 202, storage unit 203, and wired communication unit 204. It is assumed that concerned person terminal 2 is a fixed terminal.

Input unit 201 is a key, etc. for allowing the user to input various information, display unit 202 is a display, etc. for displaying various information, and storage unit 203 is a memory, etc. for storing various information.

Wired communication unit 204 performs wired communication with server 3 through a cable. For example, wired communication unit 204 receives information such as the arrival time of the user at the destination. When the concerned person inputs the station name code of the destination of the user to input unit 201, wired communication unit 204 can transmit the destination station name code to server 3.

On the other hand, when concerned person terminal 2 is a portable terminal and has a configuration for performing wireless communication with server 3, wired communication unit 204 is unnecessary. In this case, a wireless antenna and a wireless communication unit can be installed instead of wired communication unit 204.

Server 3 has designated address database 301, timetable database 302, storage unit 303, arrival time deriving unit 304, traffic information acquiring unit 305, wireless antenna 306, wireless communication unit 307, and wired communication unit 308.

Designated address database 301 is a database for storing an address of the concerned person to which the arrival time at the destination, etc. pre-designated by the user is reported according to each user.

Timetable database 302 is a database for storing the latest timetable, fee, path, etc. of the electric train.

Storage unit 303 is memory, etc. for storing various information.

When the station name codes of the departure place and the destination and the departure time information are transmitted from user terminal 1, arrival time deriving unit 304 retrieves timetable database 302 on the basis of the information and derives the arrival time of the user at the destination.

Traffic information acquiring unit 305 acquires the latest traffic information (delay or suspension information of the electric train). On the other hand, for example, a method for acquiring the latest traffic information from a website on a network (not shown) is considered as a traffic information acquiring method, but is not specially limited.

Wireless communication unit 307 performs wireless communication with user terminal 1 through wireless antenna 306, and wired communication unit 308 performs wired communication with concerned person terminal 2 through a cable. For example, wireless communication unit 307 receives the station name codes of the departure place and the destination and information of the departure time from user terminal 1. Wireless communication unit 307 and wired communication unit 308 transmit information such as the arrival time at the destination, derived by arrival time deriving unit 304, to user terminal 1 and concerned person terminal 2, respectively. Wired communication unit 308 may receive the destination information of the user from concerned person terminal 2.

On the other hand, when concerned person terminal 2 is a portable terminal and has a configuration for performing wireless communication with server 3, wired communication unit 308 is unnecessary. In this case, wireless communication unit 307 can perform the above-described operation instead of wired communication unit 308.

Automatic ticket gate 4 has reader/writer 401.

When the user passes through the neighborhood of automatic ticket gate 4 of station A which is the departure place, reader/writer 401 writes the station name code of station A to the RFID tag 101. On the other hand, since user terminal 1 has a function of the commutation ticket, reader/writer 401 reads information from RFID tag 101 and determines whether or not station A is included in the route of the commutation ticket. When the station A is not included, a process for collecting a charge amount is performed. In this regard, since this process can use an arbitrary known technology, its description is omitted.

Ticket-vending machine 5 has reader/writer 501, timetable database 502, input unit 503, display unit 504, storage unit 505, and arrival time deriving unit 506.

When the user inputs the station name code of the destination station to input unit 503 and moves user terminal 1 towards reader/writer 501, the destination station name code is written in RFID tag 101.

Timetable database 502 is a database for storing the latest timetable, fee, path, etc. of the electric train.

Input unit 503 is a key, etc. for allowing the user to input various information, display unit 504 is a display, etc. for displaying various information, and storage unit 505 is memory, etc. for storing various information.

When the destination station name code is input to input unit 503, arrival time deriving unit 506 derives the arrival time of the user at the destination by retrieving database 502 on the basis of information of the destination, station A which is the departure place stored in storage unit 505, and the current time. Here, the derived arrival time is displayed on display unit 504. Accordingly, the user can know the arrival time at the destination at the point of time when the destination station name code is input to ticket-vending machine 4.

Hereinafter, the operation of this embodiment will be described in detail.

1. Before the user passes through automatic ticket gate 4, he/she inputs the station name code of the destination station to user terminal 1. As an input method, the following (A) and (B) methods can be used as described above.

(A) The user inputs the destination station name code to input unit 503 of ticket-vending machine 5 and moves user terminal 1 towards reader/writer 501 of ticket-vending machine 5. Then, reader/writer 501 writes the destination station name code to RFID tag 101. At this time, the arrival time at the destination derived by arrival time deriving unit 506 is displayed on display unit 504. The fee or path to the destination can be displayed on display unit 504. When a means for acquiring traffic information is provided in ticket-vending machine 5, the traffic information can be displayed on display unit 504.

(B) The user himself/herself directly inputs the station name code of the destination station to input unit 102 of user terminal 1. The destination station name code is stored in storage unit 104.

In this regard, if the destination is set to the default (station B which is the arrival station registered in the commutation ticket) or if the destination is input later, the destination does not need to be first input.

2. The user moves user terminal 1 towards the neighborhood of reader/writer 401 of automatic ticket gate 4 and passes through automatic ticket gate 4 of station A. Then, the station name code of station A is written in RFID tag 101 by reader/writer 401.

3. In user terminal 1, wireless communication unit 106 transmits information of the destination station name code first input by the user, the station name code of station A of the departure place written in RFID tag 101, and the departure time, which is a current time, to server 3 when triggered by the station name code of station A of the departure place written in RFID tag 101. At this time, if the destination is not first input by the user, station B registered in the commutation ticket will be set to the default destination.

4. In server 3, arrival time deriving unit 304 retrieves timetable database 302 on the basis of the information from user terminal 1 and derives the arrival time of the user at the destination. Wireless communication unit 307 transmits information of the arrival time at the destination to user terminal 1 by e-mail. At this time, wireless communication unit 307 can also transmit information such as a fee or path to the destination and traffic information acquired by traffic information acquiring unit 305 to user terminal 1.

Figure 2:
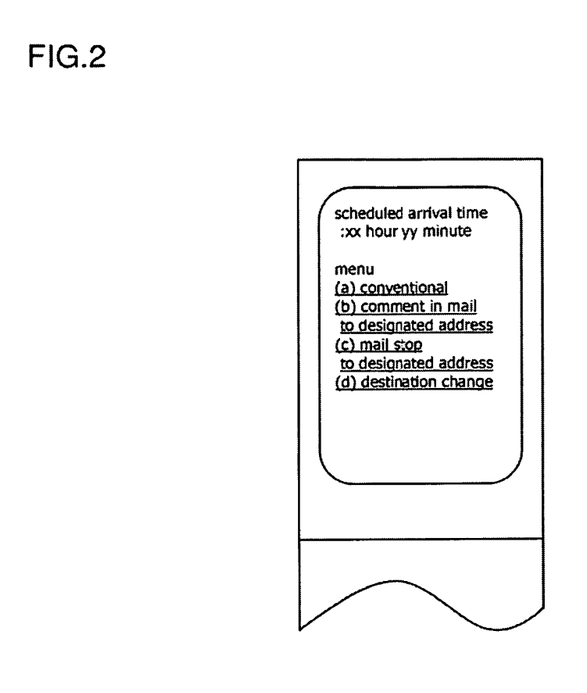
FIG. 2 is a view illustrating one example of content of an e-mail transmitted from a user to a user terminal in the information providing system shown in FIG. 1.

5. The user can know the arrival time at the destination from content of the e-mail received from user terminal 1. At this time, one example of the text of the e-mail is illustrated in FIG. 2. The user can select the following items as shown in FIG. 2.

(a) Conventional: information of the arrival time of the user at the destination is transmitted to an address of the concerned person pre-designated by the user through the e-mail.

(b) Comment in a mail to a designated address: a comment is added to the e-mail.

(c) Mail stop to a designated address: e-mail transmission is stopped.

(d) Destination change: a destination is changed.

6. In server 3, a process is performed according to an item selected by the user.

When (a) is selected, wired communication unit 308 refers to designated address database 301, checks an address of designated concerned person terminal 2, and transmits the e-mail to concerned person terminal 2. On the other hand, when no item is selected for a given time (when the e-mail is not read, or when reading e-mail is terminated without selecting the item), the operation is performed based on the assumption that (a) has been selected automatically.

When (b) is selected, wireless communication unit 307 transmits a comment input screen to user terminal 1 and receives a comment input on the comment input screen from user terminal 1. Then, wired communication unit 308 refers to designated address database 301, checks the address of designated concerned person terminal 2, and transmits the e-mail to which the comment input on the comment input screen has been added to concerned person terminal 2.

When (c) is selected, wired communication unit 308 stops the e-mail transmission to designated concerned person terminal 2.

When (d) is selected, wireless communication unit 307 transmits a destination input screen to user terminal 1 and receives a destination station name code input on the destination input screen from user terminal 1. Then, arrival time deriving unit 304 re-derives the arrival time at the destination and wireless communication unit 307 transmits information, such as the arrival time at the destination, to user terminal 1 by the e-mail.

7. The concerned person can know the arrival time of the user at the destination from the content of the e-mail received from concerned person terminal 2. In some cases the destination is set to the default (station B which is the arrival station of the commutation ticket) and the concerned person knows the destination of the user.

In this case, when the concerned person inputs the station name code of the destination of the user to input unit 201, the destination station name code is transmitted from wired communication unit 204 to server 3. Then, in server 3, arrival time deriving unit 304 re-derives the arrival time at the destination and wired communication unit 308 transmits information, such as the arrival time at the destination, to concerned person terminal 2 by the e-mail. Accordingly, the arrival time of the user at the destination can be known at the initiative of the concerned person.

In this embodiment as described above, user terminal 1 can input an arbitrary destination and server 3 can derive an arrival time to the arbitrary destination input to user terminal 1 and transmit information of the derived arrival time to user terminal 1.

Accordingly, the user can know the arrival time to the arbitrary destination as well as the arrival station of the commutation ticket. Since user terminal 1 automatically transmits information required for deriving the arrival time at the destination to server 3 when triggered by the station name code of the departure place written in RFID tag 101, the user can know the arrival time at the destination without consuming time consumption.

In this embodiment, as a method for inputting an arbitrary destination to user terminal 1, the following (A) and (B) methods can be used.

(A) The user inputs the station name code of the destination to ticket-vending machine 5 and moves user terminal 1 towards ticket-vending machine 5. Then, the station name code of the destination is written in RFID tag 101 by reader/writer 501.

(B) The user himself/herself directly inputs the station name code of the destination station to input unit 102 of user terminal 1. The destination station name code is stored in storage unit 104.

In any case, the user can input an arbitrary destination according to a simple and convenient method.

In this embodiment, server 3 also transmits information of the arrival time of the user at the destination to concerned person terminal 2 pre-designated by the user.

Accordingly, the concerned person can also know the arrival time of the user to the arbitrary destination. There will be no case where information will not be received if the user forgets to transmit the information of the arrival time at the destination or if information transmission is delayed. If the concerned person knows the destination of the user, the arrival time of the user at the destination can be known at the initiative of the concerned person by transmitting the station name code of the destination of the user from concerned person terminal 2 to server 3.

In this embodiment, when the destination station name code is input, ticket-vending machine 5 derives the arrival time at the destination and displays the derived arrival time.

Accordingly, the user can know the arrival time at the destination at the point of time when the destination station name code is input to ticket-vending machine 4.

On the other hand, in this embodiment, the departure place passage checking device has been described as automatic ticket gate 4 installed in station A which is the departure place, but the present invention is not limited thereto. That is, the departure place passage checking device is not limited to automatic ticket gate 4 as long as it is installed in the departure place.

In this embodiment, the destination input device has been described as ticket-vending machine 5 installed in station A as the departure place, but the present invention is not limited thereto. That is, the destination input device is not limited to the departure place, and may be installed in an arbitrary place and is not limited to ticket-vending machine 5.

In this embodiment, the departure place and the destination have been described as stations of an electric train, but the present invention is not limited thereto. That is, the departure place and the destination may be departure and arrival places of public transportation facilities (for example, bus stop, etc.)

In this embodiment, information of the arrival time such as the destination of the user is provided by the e-mail, but the present invention is not limited thereto. That is, the information can be provided on the site screen of a website.

Second Embodiment

Figure 3:
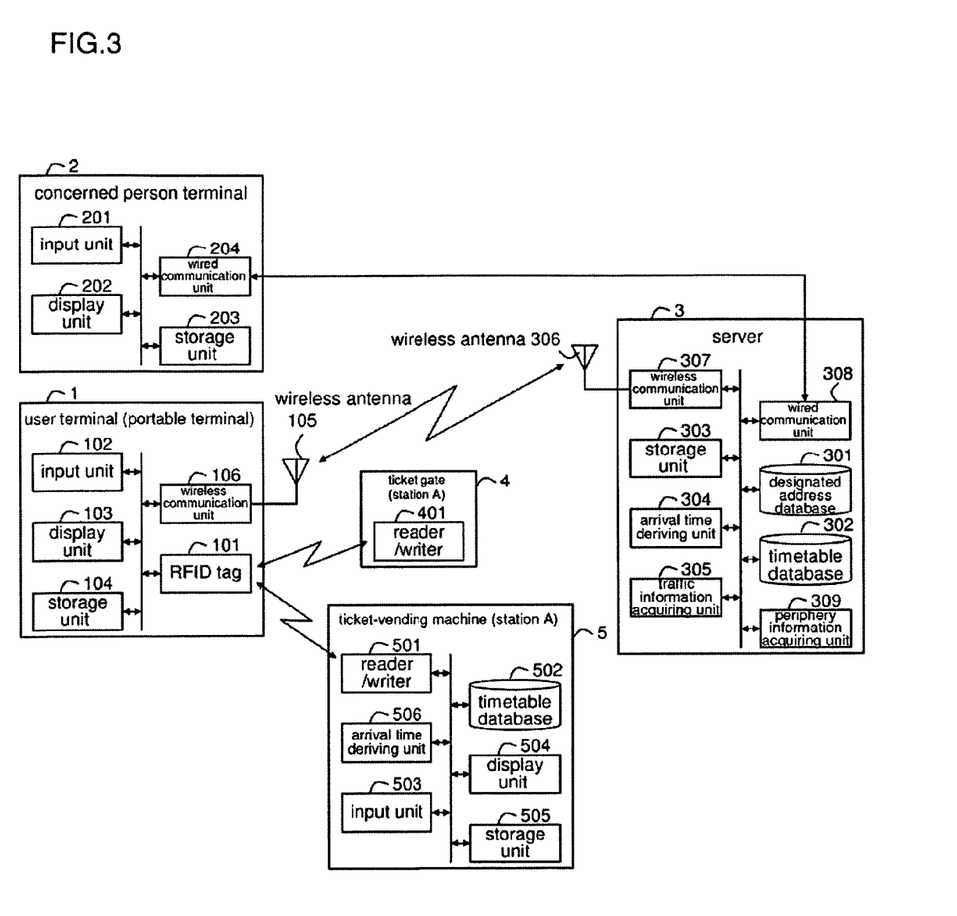
FIG. 3 is a view illustrating the configuration of an information providing system of a second embodiment of the present invention.

FIG. 3 is a view illustrating the configuration of an information providing system of a second embodiment of the present invention.

Referring to FIG. 3, the information providing system of this embodiment is different from that of the first embodiment in that periphery information acquiring unit 309 is provided in server 3. The other configuration is the same as that of the first embodiment.

When user terminal 1 sets the destination to a station different from the arrival station of the commutation ticket, periphery information acquiring unit 309 acquires periphery information of the destination (facility information of convenience stores, accommodations, etc.). On the other hand, a method for acquiring periphery information of the destination from a website on a network (not shown) is considered as, for example, a periphery information acquiring method, but is not specially limited.

Figure 4:
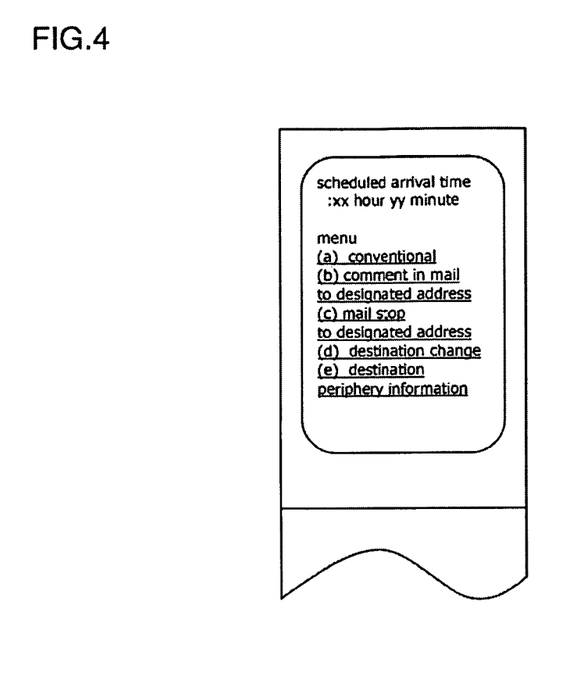
FIG. 4 is a view illustrating one example of content of an e-mail transmitted from a user to a user terminal in the information providing system shown in FIG. 3.

In this case, as shown in FIG. 4, wireless communication unit 307 arranges for e-mail alert to be sent which will report an arrival time and from which the following item (e) can be also selected.

(e) Destination periphery information: information of the destination periphery is checked.

When (e) is selected, periphery information acquiring unit 309 acquires the destination periphery information and wireless communication unit 307 transmits the destination periphery information to user terminal 1. The other operation is the same as that of the first embodiment.

In this embodiment as described above, the destination periphery information can be provided in response to a user request since server 3 has periphery information acquiring unit 309 for acquiring the destination periphery information. The other effect is the same as that of the first embodiment.

Third Embodiment

Figure 5:
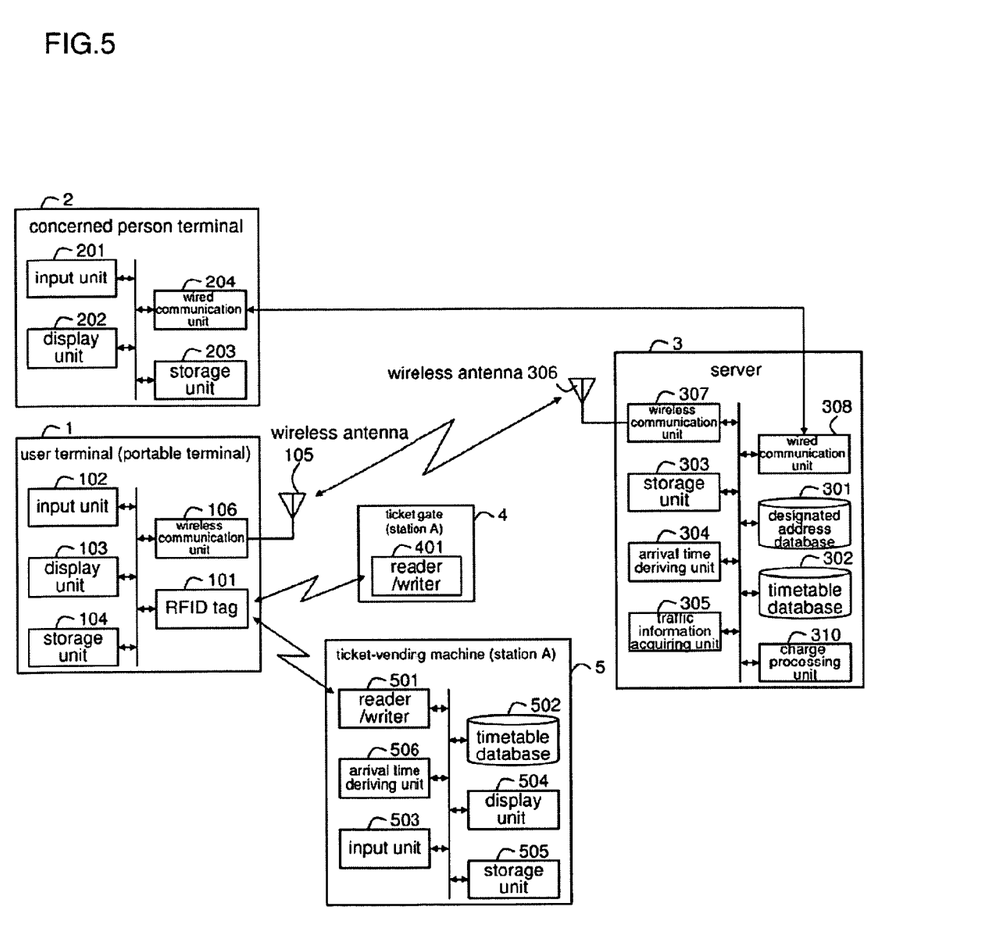
FIG. 5 is a view illustrating the configuration of an information providing system of a third embodiment of the present invention.

FIG. 5 is a view illustrating the configuration of an information providing system of a third embodiment of the present invention.

Referring to FIG. 5, the information providing system of this embodiment is different from that of the first embodiment in that charge processing unit 310 is provided in server 3. The other configuration is the same as that of the first embodiment.

Charge processing unit 310 determines whether or not to additionally collect a fee when the user moves from the departure place to the destination. When the fee must be collected additionally, a charge process for user terminal 1 is performed.

For example, charge processing unit 310 determines that the additional collection of a fee must be performed when a valid period of the commutation ticket expires or when a fee of an already collected charge amount is not sufficient since a range out of the route of the commutation ticket is included in a range from the departure place to the destination according to movement out of the section.

On the other hand, information of the route of the commutation ticket, the valid period, the charge amount, etc. can be transmitted from wireless communication unit 106 of user terminal 1 to server 3 and can be transmitted from a communication unit (not shown) (regardless of whether the device is wired or wireless) of automatic ticket gate 4 to server 3.

Figure 6:
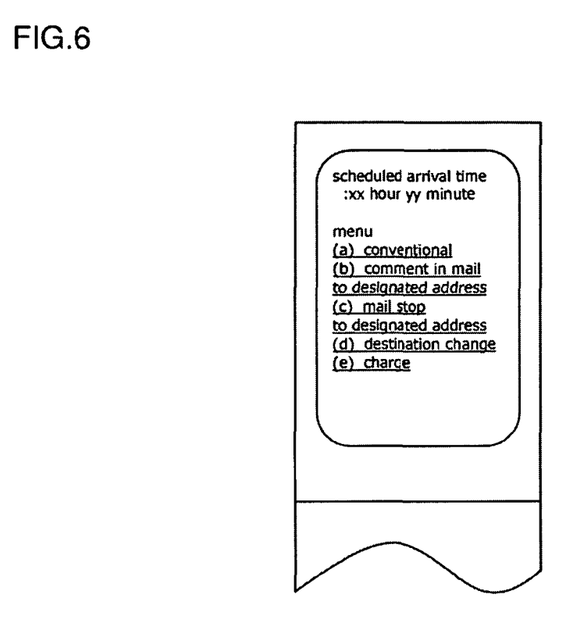
FIG. 6 is a view illustrating one example of content of an e-mail transmitted from a user to a user terminal in the information providing system shown in FIG. 5.

In this case, as shown in FIG. 6, wireless communication unit 307 arranges for e-mail alert to be sent which will report an arrival time and from which the following item (e) can be also selected.

(e) Charge: a charge amount is added.

When (e) is selected, charge processing unit 301 performs a process for collecting a charge amount using a credit card or etc. Since this charge process can use an arbitrary known technology, its description is omitted. The other operation is the same as that of the first embodiment.

In this embodiment as described above, the user can simply add the charge amount on the move since server 3 has charge processing unit 310 to perform the charge process for user terminal 1. The other effect is the same as that of the first embodiment.

Fourth Embodiment

Figure 7:
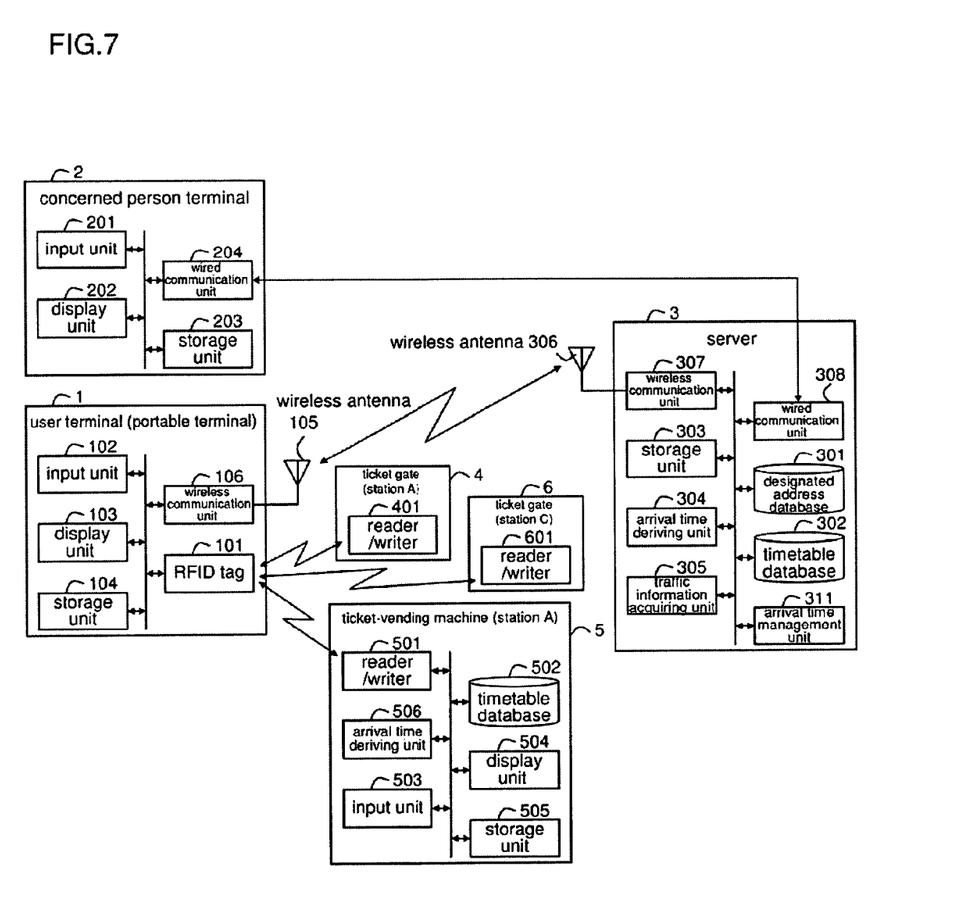
FIG. 7 is a view illustrating the configuration of an information providing system of a fourth embodiment of the present invention.

FIG. 7 is a view illustrating the configuration of an information providing system of a fourth embodiment of the present invention.

Referring to FIG. 7, the information providing system of this embodiment is different from that of the first embodiment in that arrival time management unit 311 is provided in server 3. On the other hand, in FIG. 7, automatic ticket gate 6 which is a destination passage checking device installed in station C, as the destination of the user, is also shown. The other configuration is the same as that of the first embodiment.

Arrival time management unit 311 manages the arrival time of the user at the destination derived by arrival time deriving unit 304. Specifically, arrival time management unit 311 determines whether or not a given time from the arrival time at the destination has elapsed.

When the user passes through the neighborhood of automatic ticket gate 6 of station C which is the destination, the station name code of station C is written in RFID tag 101 by reader/writer 601 of automatic ticket gate 6. This notification is provided from wireless communication unit 106 of user terminal 1 to server 3.

However, when writing in RFID tag 101 by automatic ticket gate 6 is absent after the given time from the arrival time at the destination has elapsed, wired communication unit 308 transmits an alarm mail indicating its notification to concerned person terminal 2.

When there is writing in RFID tag 101 in an automatic ticket gate of a station other than the destination before the writing in RFID tag 101 by automatic ticket gate 6, its notification is provided from wireless communication unit 106 of user terminal 1 to server 3. Also in this case, an alarm mail can be transmitted to concerned person terminal 2. The other operation is the same as that of the first embodiment.

In this embodiment as described above, the concerned person can know that the user has not reached the destination by a scheduled time since server 3 transmits the alarm mail to concerned person terminal 2. The other effect is the same as that of the first embodiment.

On the other hand, in the present invention, a combination of the above-described second to fourth embodiments can be configured.

Although the present invention has been described with reference to embodiments, the invention is not to be restricted to the embodiments. It is to be appreciated that those skilled in the art can change or modify the embodiments without departing from the spirit and the scope of the invention.

The present application is the National Phase of PCT/JP2007/070240, filed Oct. 17, 2007, which is based upon and claims priority from Japanese Patent Application No. 2006-299095 filed on Nov. 2, 2006, the entire contents of which are incorporated herein.

The invention claimed is:

1. An information providing system comprising:
a portable terminal; and
a server that provides the portable terminal with information of an arrival time of the portable terminal at a destination,
wherein the portable terminal comprises
an RFID tag to which identification information of the destination and identification information of a departure place are written; and
a communication unit that transmits the destination identification information, the departure place identification information, and information of a departure time which is a current time to the server when triggered by the departure place identification information written in the RFID tag; and
wherein the server comprises
an arrival time deriving unit that derives the arrival time at the destination using the departure place identification information, the destination identification information, and the departure time information transmitted from the portable terminal; and
a communication unit that transmits the information of the arrival time at the destination to the portable terminal;
wherein the information providing system further comprises:
a departure place passage checking device installed in the departure place and having a write unit that writes the departure place identification information to the RFID tag when the portable terminal passes near its own device; and
a destination input device installed in an arbitrary point and having an input unit to which the destination identification information is input and a write unit that writes the destination identification information to the RFID tag,
wherein the destination input device comprises:
an arrival time deriving unit that derives the arrival time at the destination by using the place where the destination input device is installed as the departure place and by using the information of the destination and the current time; and
a display unit that displays the arrival time at the destination.

2. An information providing system comprising:
a portable terminal; and
a server that provides the portable terminal with information of an arrival time of the portable terminal at a destination,
wherein the portable terminal comprises
an input unit to which identification information of the destination is input;
a storage unit in which the destination identification information is stored;
an RFID tag to which identification information of a departure place is written; and
a communication unit that transmits the destination identification information, the departure place identification information, and information of a departure time which is a current time to the server when triggered by the departure place identification information written in the RFID tag; and
wherein the server comprises
an arrival time deriving unit that derives the arrival time at the destination using the departure place identification information, the destination identification information, and the departure time information transmitted from the portable terminal; and
a communication unit that transmits the information of the arrival time at the destination to the portable terminal,
wherein the communication unit of the server transmits the information of the arrival time at the destination to another terminal.

3. The information providing system according to claim 2, further comprising a departure place passage checking device installed in the departure place and having a write unit that writes the departure place identification information to the RFID tag when the portable terminal passes near its own device.

4. The information providing system according to claim 1, wherein the server further comprises a periphery information acquiring unit that acquires periphery information of the destination.

5. The information providing system according to claim 1, wherein the server further comprises a charge processing unit that performs a charge process for the portable terminal under a given condition.

6. A method for providing information of an arrival time of a portable terminal at a destination, from a server to the portable terminal, comprising:
writing, by the portable terminal, identification information of the destination and identification information of a departure place to an RFID tag;
transmitting, by the portable terminal, the destination identification information, the departure place identification information, and information of a departure time which is a current time to the server when triggered by the departure place identification information written in the RFID tag;
deriving, by the server, the arrival time at the destination using the departure place identification information, the destination identification information, and the departure time information transmitted from the portable terminal; and
transmitting, by the server, the information of the arrival time at the destination to the portable terminal,
wherein in the writing step,
a departure place passage checking device installed in the departure place writes the departure place identification information to the RFID tag when the portable terminal passes near its own device, and
a destination input device installed in an arbitrary point writes the destination identification information to the RFID tag at arbitrary timing,
wherein the information providing method further comprises:
deriving, by the destination input device, the arrival time at the destination by using the place where the destination input device is installed as the departure place and by using the information of the destination and the current time; and displaying, by the destination input device, the arrival time at the destination.

7. A method for providing information of an arrival time of a portable terminal at a destination, from a server to the portable terminal, comprising:
- inputting, by the portable terminal, identification information of the destination;
- storing, by the portable terminal, the destination identification information;
- writing, by the portable terminal, identification information of a departure place to an RFID tag;
- transmitting, by the portable terminal, the destination identification information, the departure place identification information, and information of a departure time which is a current time to the server when triggered by the departure place identification information written in the RFID tag;
- deriving, by the server, the arrival time at the destination using the departure place identification information, the destination identification information, and the departure time information transmitted from the portable terminal;
- transmitting, by the server, the information of the arrival time at the destination to the portable terminal; and
- transmitting, by the server, the information of the arrival time at the destination to another terminal.

8. The method according to claim 7, wherein the destination identification information is input to the portable terminal at arbitrary timing in the inputting step and
- a destination input device installed in an arbitrary point writes the destination identification information to the RFID tag in the writing step at timing when the portable terminal passes near its own device.

9. The information providing method according to claim 6, further comprising acquiring, by the server, periphery information of the destination.

10. The information providing method according to claim 6, further comprising performing, by the server, a charge process for the portable terminal under a given condition.

11. An information providing system comprising:
a portable terminal; and
a server that provides the portable terminal with information of an arrival time of the portable terminal at a destination,
wherein the portable terminal comprises
an RFID tag to which identification information of the destination and identification information of a departure place are written; and
a communication unit that transmits the destination identification information, the departure place identification information, and information of a departure time which is a current time to the server when triggered by the departure place identification information written in the RFID tag; and
wherein the server comprises
an arrival time deriving unit that derives the arrival time at the destination using the departure place identification information, the destination identification information, and the departure time information transmitted from the portable terminal; and
a communication unit that transmits the information of the arrival time at the destination to the portable terminal,
wherein the communication unit of the server transmits the information of the arrival time at the destination to another terminal.

12. An information providing system comprising:
a portable terminal; and
a server that provides the portable terminal with information of an arrival time of the portable terminal at a destination,
wherein the portable terminal comprises
an RFID tag to which identification information of the destination and identification information of a departure place are written; and
a communication unit that transmits the destination identification information, the departure place identification information, and information of a departure time which is a current time to the server when triggered by the departure place identification information written in the RFID tag; and
wherein the server comprises
an arrival time deriving unit that derives the arrival time at the destination using the departure place identification information, the destination identification information, and the departure time information transmitted from the portable terminal; and
a communication unit that transmits the information of the arrival time at the destination to the portable terminal,
wherein the information providing system further comprises:
a destination passage checking device installed in the destination and having a write unit that writes the destination identification information to the RFID tag when the portable terminal passes near its own device,
wherein the server further comprises an arrival time management unit that manages the arrival time at the destination, and
wherein the communication unit of the server transmits the information of the arrival time at the destination to another terminal and makes a notification to the other terminal when the writing in the RFID tag by the destination passage checking device is present after a given time from the arrival time at the destination has elapsed and when the writing in the RFID tag in a place other than the destination is present before the writing by the destination passage checking device.

13. An information providing system comprising:
a portable terminal; and
a server that provides the portable terminal with information of an arrival time of the portable terminal at a destination,
wherein the portable terminal comprises
an input unit to which identification information of the destination is input;
a storage unit in which the destination identification information is stored;
an RFID tag to which identification information of a departure place is written; and
a communication unit that transmits the destination identification information, the departure place identification information, and information of a departure time which is a current time to the server when triggered by the departure place identification information written in the RFID tag; and
wherein the server comprises
an arrival time deriving unit that derives the arrival time at the destination using the departure place identification information, the destination identification information, and the departure time information transmitted from the portable terminal; and
a communication unit that transmits the information of the arrival time at the destination to the portable terminal, wherein the information providing system further comprises:

a destination passage checking device installed in the destination and having a write unit that writes the destination identification information to the RFID tag when the portable terminal passes near its own device, wherein the server further comprises an arrival time management unit that manages the arrival time at the destination, and wherein the communication unit of the server transmits the information of the arrival time at the destination to another terminal and makes a notification to the other terminal when the writing in the RFID tag by the destination passage checking device is present after a given time from the arrival time at the destination has elapsed and when the writing in the RFID tag in a place other than the destination is present before the writing by the destination passage checking device.

14. A method for providing information of an arrival time of a portable terminal at a destination, from a server to the portable terminal, comprising:

writing, by the portable terminal, identification information of the destination and identification information of a departure place to an RFID tag;

transmitting, by the portable terminal, the destination identification information, the departure place identification information, and information of a departure time which is a current time to the server when triggered by the departure place identification information written in the RFID tag;

deriving, by the server, the arrival time at the destination using the departure place identification information, the destination identification information, and the departure time information transmitted from the portable terminal;

transmitting, by the server, the information of the arrival time at the destination to the portable terminal; and transmitting, by the server, the information of the arrival time at the destination to another terminal.

15. A method for providing information of an arrival time of a portable terminal at a destination, from a server to the portable terminal, comprising:

writing, by the portable terminal, identification information of the destination and identification information of a departure place to an RFID tag;

transmitting, by the portable terminal, the destination identification information, the departure place identification information, and information of a departure time which is a current time to the server when triggered by the departure place identification information written in the RFID tag;

deriving, by the server, the arrival time at the destination using the departure place identification information, the destination identification information, and the departure time information transmitted from the portable terminal;

transmitting, by the server, the information of the arrival time at the destination to the portable terminal;

transmitting, by the server, the information of the arrival time at the destination to another terminal;

writing, by a destination passage checking device installed in the destination, the destination identification information to the RFID tag when the portable terminal passes near its own device; and making, by the server, a notification to the other terminal when the writing in the RFID tag by the destination passage checking device is present after a given time from the arrival time at the destination has elapsed and when the writing in the RFID tag in a place other than the destination is present before the writing by the destination passage checking device.

16. A method for providing information of an arrival time of a portable terminal at a destination, from a server to the portable terminal, comprising:

inputting, by the portable terminal, identification information of the destination;

storing, by the portable terminal, the destination identification information;

writing, by the portable terminal, identification information of a departure place to an RFID tag;

transmitting, by the portable terminal, the destination identification information, the departure place identification information, and information of a departure time which is a current time to the server when triggered by the departure place identification information written in the RFID tag;

deriving, by the server, the arrival time at the destination using the departure place identification information, the destination identification information, and the departure time information transmitted from the portable terminal;

transmitting, by the server, the information of the arrival time at the destination to the portable terminal;

transmitting, by the server, the information of the arrival time at the destination to another terminal;

writing, by a destination passage checking device installed in the destination, the destination identification information to the RFID tag when the portable terminal passes near its own device; and making, by the server, a notification to the other terminal when the writing in the RFID tag by the destination passage checking device is present after a given time from the arrival time at the destination has elapsed and when the writing in the RFID tag in a place other than the destination is present before the writing by the destination passage checking device.

* * * * *